US012678935B2

(12) United States Patent
Livolsi et al.

(10) Patent No.: US 12,678,935 B2
(45) Date of Patent: Jul. 14, 2026

(54) SYSTEM AND PROCESS FOR ESTIMATION OF GAIT PHASE FOR USE WITH A WEARABLE ROBOT

(71) Applicant: IUVO S.R.L, Pontedera (IT)

(72) Inventors: Chiara Livolsi, Pontedera (IT); Simona Crea, Pontedera (IT); Roberto Conti, Pontedera (IT); Francesco Giovacchini, Pontedera (IT); Nicola Vitiello, Pontedera (IT)

(73) Assignee: IUVO S.R.L, Pontedera (IT)

( * ) Notice: Subject to any disclaimer, the term of this patent is extended or adjusted under 35 U.S.C. 154(b) by 799 days.

(21) Appl. No.: 18/025,113

(22) PCT Filed: Sep. 7, 2021

(86) PCT No.: PCT/IB2021/058139
§ 371 (c)(1),
(2) Date: Mar. 7, 2023

(87) PCT Pub. No.: WO2022/053934
PCT Pub. Date: Mar. 17, 2022

(65) Prior Publication Data
US 2023/0330835 A1      Oct. 19, 2023

Related U.S. Application Data

(60) Provisional application No. 63/075,470, filed on Sep. 8, 2020.

(51) Int. Cl.
B25J 9/00       (2006.01)
A61H 1/02       (2006.01)
A61H 3/00       (2006.01)

(52) U.S. Cl.
CPC .......... B25J 9/0006 (2013.01); A61H 1/0244 (2013.01); A61H 3/00 (2013.01);
(Continued)

(58) Field of Classification Search
CPC ...... B25J 9/0006; A61H 1/0244; A61H 1/024; A61H 1/0262; A61H 1/0266;
(Continued)

(56) References Cited

U.S. PATENT DOCUMENTS

| | | | |
|---|---|---|---|
| 11,034,016 B2 * | 6/2021 | Lerner | B25J 9/0006 |
| 2004/0015103 A1 * | 1/2004 | Aminian | G08B 21/0446 |
| | | | 600/595 |

(Continued)

FOREIGN PATENT DOCUMENTS

| | | |
|---|---|---|
| CN | 109620652 A | 4/2019 |
| EP | 3593781 A1 | 1/2020 |

(Continued)

OTHER PUBLICATIONS

International Search Report from PCT Application No. PCT/IB2021/058139, Dec. 21, 2021.

(Continued)

*Primary Examiner* — Joseph D. Boecker
*Assistant Examiner* — Thomas W Greig
(74) *Attorney, Agent, or Firm* — Workman Nydegger

(57) ABSTRACT

A wearable robot and method for controlling the wearable robot having at least one leg unit involves: (a) obtaining at least one input signal from at least one encoder tracking a hip joint angle versus time with the at least one encoder attached to the wearable robot and corresponding to the at least one leg unit; (b) windowing the at least one input signal within a window size based on time versus the hip joint angle; (c) decomposing the at least one input signal with a Discrete Wavelet Transform (DWT); (d) identifying at least one gait event in a gait cycle by using the DWT; (e) computing temporal gait parameters based on the at least one gait event; (f) generating an assistive force in the at least one leg unit in response to the temporal gait parameters.

20 Claims, 6 Drawing Sheets

(52) U.S. Cl.
CPC .................. *A61H 2201/165* (2013.01); *A61H 2201/5007* (2013.01); *A61H 2201/5069* (2013.01)

(58) Field of Classification Search
CPC .... A61H 2201/0248; A61H 2201/0251; A61H 3/00; A61H 2230/625
See application file for complete search history.

(56) References Cited

U.S. PATENT DOCUMENTS

| | | | | |
|---|---|---|---|---|
| 2012/0310122 A1* | 12/2012 | Endo | ........................ | A61H 3/00 601/35 |
| 2013/0056981 A1* | 3/2013 | Mullins | ................... | F03G 5/095 290/7 |
| 2014/0163435 A1* | 6/2014 | Yamamoto | ............... | A61H 3/00 601/35 |
| 2014/0213951 A1* | 7/2014 | Pietrusisnki | ........... | A61H 3/008 602/23 |
| 2015/0142130 A1* | 5/2015 | Goldfarb | .................. | A61H 3/00 623/25 |
| 2016/0338897 A1* | 11/2016 | Takenaka | .................. | A61H 3/00 |
| 2017/0027803 A1* | 2/2017 | Agrawal | .............. | A61B 5/1122 |
| 2017/0049587 A1* | 2/2017 | Herr | ....................... | A61F 2/6607 |
| 2017/0367919 A1 | 12/2017 | Vitiello et al. | | |
| 2019/0240103 A1* | 8/2019 | Hepler | ..................... | A61H 3/00 |
| 2020/0030176 A1* | 1/2020 | Yu | ......................... | A61H 1/0262 |
| 2021/0128972 A1* | 5/2021 | Lee | .................. | A63B 21/00181 |

FOREIGN PATENT DOCUMENTS

| | | | | |
|---|---|---|---|---|
| WO | WO-2014153201 A1 * | 9/2014 | ......... | A63B 24/0087 |
| WO | 2019211791 A1 | 11/2019 | | |

OTHER PUBLICATIONS

Ji et al., "Appropriate Mother Wavelets for Continuous Gait Event Detection Based on Time-Frequency Analysis for Hemiplegic and Healthy Individuals," Sensors (Basel), vol. 19, Aug. 8, 2019, 18 pages.

Winter, "Biomechanics and Motor Control of Human Movement," Fourth Edition, John Wiley & Sons, Oct. 12, 2009, 383 pages.

* cited by examiner

SYSTEM AND PROCESS FOR ESTIMATION OF GAIT PHASE FOR USE WITH A WEARABLE ROBOT

FIELD OF THE DISCLOSURE

A system and process are provided for use with a wearable robot to estimate a gait phase. The system and process employ adaptive oscillators and a gait phase estimator for a portable hip exoskeleton for gait assistance based on Discrete Wavelet Transform (DWT) applied to angular measurements. The system and process can track the gait phase continuously and identify relevant biomechanical gait events to segment the gait cycle in real-time.

BACKGROUND

Gait disorders and lower-limb impairments due to aging and pathological conditions, such as neurological and musculoskeletal diseases, are causes of restricted life and loss of personal independence. Wearable robots (WR), such as robotic exoskeletons (RE), are provided to assist in movement, restore functional gait patterns, and represent technical aids to provide support in daily-life scenarios. In addition, WRs can improve rehabilitation programs for people with limb impairments and ambulatory conditions.

Portable WRs are commercially available, and some have recently reached the market, showing that the WR field is rapidly moving "outside the lab" to meet real-life applications.

Significant challenges remain in designing WRs to realize more natural cooperation between the human user and the robot. Ideally, a so-called physical Human-Robot Interface (pHRI) would guarantee a comfortable exchange of mechanical power from the robot to the human user, preferably due to an adequate kinematics coupling, as well as a stable and effective weight distribution. A cognitive Human-Robot Interface (cHRI) should ensure intuitive decoding and adaptive and reliable assistive strategies in different locomotion tasks. In the case of assistive devices for people with mild lower-limb impairments, monitoring movement signals of the wearer are of paramount importance in realizing volitional control strategies.

Several sensory systems include reliable gait phase estimation and assistive controllers, such as foot switches, pressure-sensitive insoles, EMG sensors, encoders, inertial measurement units (IMUs), etc. Foot sensors, in particular, have been shown to detect gait events related to foot-ground interaction reliably; however, their use in daily scenarios is significantly limited by an inherent need for repeated calibrations and limited sensor durability. In the field of WRs, while not explicitly demonstrated by dedicated studies, the choice of connecting an exoskeleton to an external sensory apparatus is expected to limit overall system usability, particularly in outside-the-lab applications. Self-containment of the sensory system in an exoskeleton would instead improve the device's portability, reliability, and usability.

Allowing a user freedom of movement and increased comfort in daily-life use of WRs requires that any encumbrance attributable to the sensory system be minimized. Accordingly, an important challenge in WRs is to accomplish reliable gait phase estimation and assistive control by using integrated sensors that minimize the invasiveness of the pHRI on the user.

Continuous gait phase estimation may allow WRs to provide a phase-based assistive action, specifically tailored to a user's unique gait pattern and synchronous with specific biomechanics events or gait phases while leaving the user free to move when assistive action is not required. One approach to estimating the gait phase in real-time is based on Adaptive Oscillators (AOs). AOs can extract high-level features, such as phase, frequency, amplitude, and offset, from quasi-periodic input signals. In some WRs, AOs have been coupled with Gait Event Detection (GED) processes to smoothly and stably reset the phase when a specific predefined biomechanics event occurs (e.g., at heel strike or other events).

In controlling an Active Pelvis Orthosis (APO), a previous approach has been to extract a Maximum Flexion Angle (MFA) from a hip flexion angle to reset an AO-based phase estimator. The hip angles are acquired from onboard sensors to avoid the need for other sensing systems. The method has been tested with the APO controlled to provide null assistance and showed remarkable performance in gait phase estimation during treadmill walking.

Despite its simplicity, this approach suffers from inaccuracies in angle measurements due to the human-robot interaction dynamics when the sensor adapted to measure the joint angle (e.g., encoder) is collocated on the actuation unit axis. Specifically, soft-tissue compression of a user's limb due to an assistive action limits the reliability of the peak detection in an MFA-based approach. Further, while easily detectable, the MFA is not a standard biomechanics event for segmenting a gait cycle, as phase shift/occurrence during stride can be subject, velocity, and task-dependent.

Identifying biomechanically relevant events, such as the heel strike (HS) and toe-off (TO), from input signals acquired from integrated sensors, would enable defining phase-locked assistive profiles more easily. In addition, such identification could advantageously be easily tuned by clinicians, based on normative data, and estimate temporal gait parameters, to provide quantitative metrics related to the quality of the gait while increasing portability, reliability, and usability of a WR device.

SUMMARY

The system and process for estimation of gait phase with a wearable robot (WR) or a robotic exoskeleton (RE), according to the disclosure, provides a new gait phase estimator capable of tracking the gait phase in real-time and of identifying relevant biomechanical gait events, for example, to reset the phase and segment the gait cycle. Furthermore, the gait event detection is based on a Discrete Wavelet Transform (DWT) that identifies at least one gait event, such as heel strike (HS) and toe-off (TO) events, based on hip joint angle signals_rather than from acceleration/speed, thus avoiding the need to use additional sensors other than those already integrated into the RE structure.

An exemplary RE comprises an active pelvis orthosis (APO) and an actuation system to assist bilateral hip flexion/extension movements transmitted by first and second leg units. The APO may include a trunk from which the actuation system extends to at least one hip joint at which at least one encoder is arranged, the at least one hip joint corresponding to at least one leg unit. The at least one encoder may be arranged to measure the hip flexion/extension angle of the at least one leg unit relative to the trunk at the at least one hip joint. The APO preferably includes a power unit and a computing unit. The power unit is preferably arranged to provide assistive power to the actuation system for driving at least one leg unit at the hip joints based on the computing unit determining segmentation of a user's gait cycle from input signals of at least one encoder.

The APO includes a gait phase estimator combined with the computing unit and adapted to process the input signals of at least one encoder. The gait phase estimator includes a primary phase estimator based on adaptive oscillators (AOs), a gait-event detector, and a phase-error compensator. The AOs of the primary phase estimator decompose a periodic hip angle signal into different harmonics. Then, the phase, frequency, amplitude, and offset of each harmonic are estimated, and the primary phase estimator reconstructs a corrected gait phase.

The gait-event detector may identify a gait event of the gait cycle based on a DWT of the input signals. For example, the gait-event detector may be arranged for identifying an HS and/or TO event of the gait cycle by using the DWT to process hip joint angle signals measured by at least one encoder.

The main block of the Gait Event Detection (GED) process is based on using the DWT to decompose the signal into low- and high-level frequency components, which are then processed using threshold-based routines to identify the specific events.

The GED process may calculate discrete wavelet coefficients on a vector of hip angle samples acquired within a time window. The process for identifying HS and TO from the input signals preferably has five main steps: (i) calculation of discrete wavelet coefficients; (ii) threshold-based event detection; (iii) knowledge-based verification; (iv) computation of temporal gait parameters, and (vii) adaptive update of the window's length.

When the detection of $HS_{DWT}$ occurs, a phase error learning block of the phase-error compensator may determine a phase reset error and dynamically compensate for the phase error. The estimated phase may be a continuum variable ranging from zero to $2\pi$ in each stride. The zero-phase value should match the desired event identified by the event detection block. The phase error learning block computes the mismatch between zero and the estimated phase during the event detected. The error between the reconstructed signal and the original one is fed back to the input to direct the evolution of the dynamic system. Thus, AOs in embodiments of the current disclosure can learn and synchronize with the cyclical signal in input adaptively and quickly, in real-time.

According to the system and process of this disclosure, a new gait phase estimator for a WR or RE, such as an APO, may be based on employing a DWT and AOs. The system and process improve the high-level APO control system by enabling the synchronization of a null phase with a desired biomechanical event (e.g., HS) and the design of the gait phase-dependent desired assistive torque. More specifically, the correct and exact detection of the specific HS and TO events allows the APO to (i) adapt an assistive torque profile of the actuator system in the APO to a gait pattern of the user, with the ability to discriminate between swing and stance phases, (ii) adapt the assistive torque profile to different gait patterns of a user, whether due to physiological or non-physiological characteristics (e.g., subjects with neurological disorders, etc.), (iii) adapt the assistive torque profile to variable walking speeds, and (iv) improve the usability for clinicians. The process adaptively learns the walking frequency using the AOs and identifies each step's beginning and end through the novel DWT-based gait event detector.

An advantage of this process is that accurate identification of gait events and estimation of the gait cycle in real-time does not require additional sensors outside of the WR, such as shoe sensors or the like as employed in prior art systems and processes. The system and process according to the present embodiments may be arranged to extract distal foot events (i.e., HS and TO) in real-time, by exploiting only signals of encoders located at the hip joints of the WR, enhancing the potentiality of the cognitive cHRI while keeping the complexity of the physical pHRI to a minimum. In addition, the DWT-based process can enhance discriminative signal features identifying relevant biomechanical events and phases of the gait cycle.

From the real-time identification of HS and TO events in the gait cycle, energetic cost benefits and human-robot cooperation between the user and the WR may be maximized. Similarly, real-time identification of gait events based on DWT of the input signals allows for a null phase of the estimated gait to occur synchronously with the HS event and for information about the TO event to be provided in real-time. These advantages are crucial to designing phase-locked assistive profiles easily ascribable to physiological hip torque profiles, thus making the tuning procedure user-friendly for both clinical personnel and the user.

The Identification of the two relevant gait events (i.e., HS and TO) further equips the APO with an additional capability to measure quantitative gait parameters during the walking activities, including stance and swing phases, single and double support phases. For an assistive lower-limb device conceived for rehabilitation in a clinical environment, but also gait assistance outside clinics, the additional ability to assess the gait quality of the user (in terms of temporal parameters, symmetric indexes, cadence, etc.) is an essential feature because it allows evaluating the user's gait pattern without additional instruments and outside dedicated gait analysis laboratories, enhancing patient self-assessment and paving the way for novel monitoring techniques, in which the clinician can remotely monitor the patient walking outdoors.

These and other present disclosure features will become better understood regarding the following description, appended claims, and accompanying drawings.

Figures 1A, 1B:
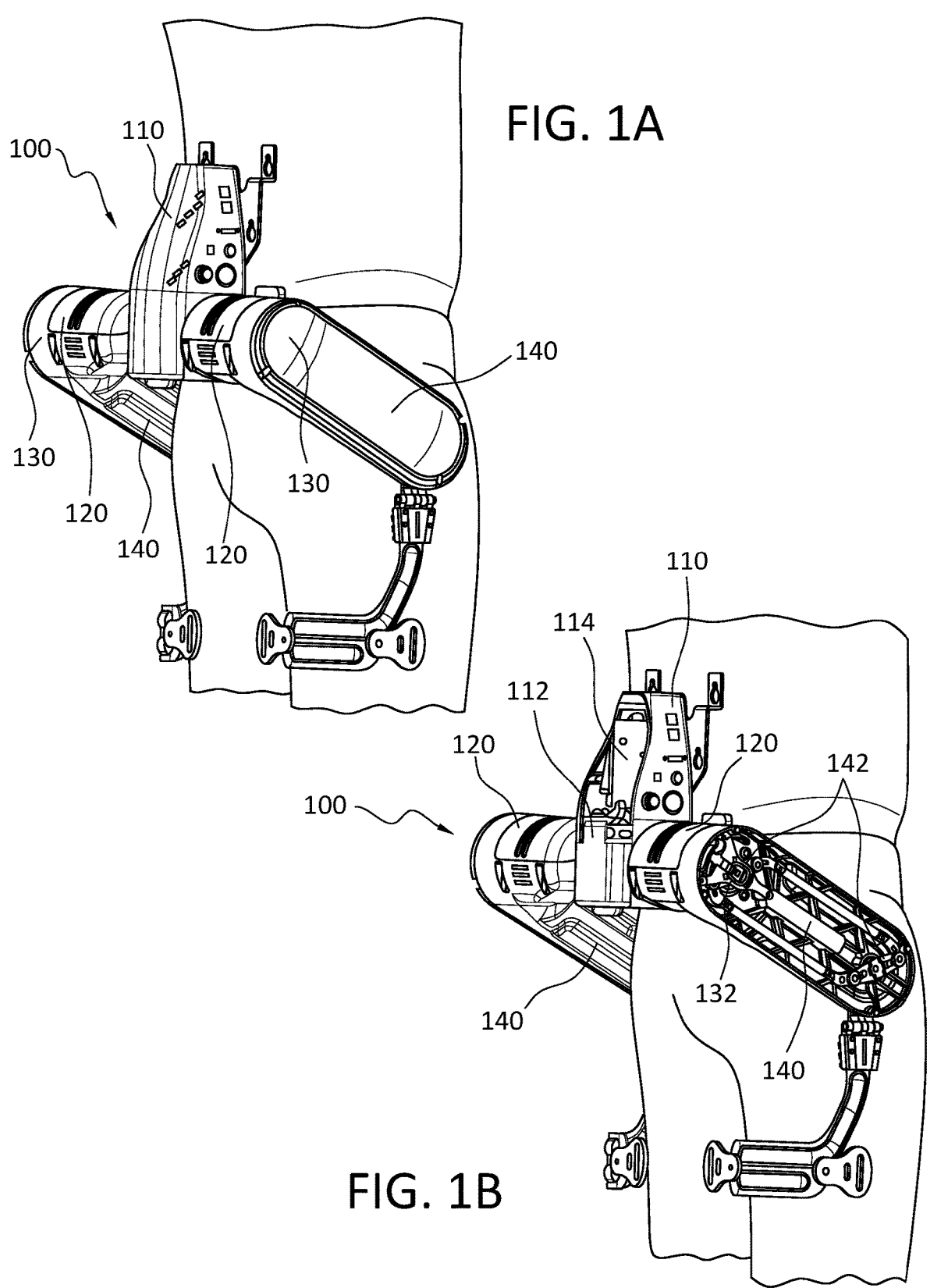
FIG. 1a is a perspective view illustrating an exemplary wearable robot device arranged as Active Pelvis Orthosis.
FIG. 1b is a perspective view illustrating an exemplary wearable robot device arranged as Active Pelvis Orthosis having an open shell.

The drawing figures are not necessarily drawn to scale, but instead, are drawn to provide a better understanding of the components, and are not intended to be limiting in scope, but to provide exemplary illustrations.

DETAILED DESCRIPTION

The system and process for estimation of gait phase with a wearable robot (WR) or robotic exoskeleton (RE) according to various embodiments provide a new gait phase estimator, capable of tracking the gait phase in real-time and identifying relevant biomechanical gait events to reset the phase and segment the gait cycle. The gait event detection is based on a Discrete Wavelet Transform (DWT) that identifies at least one gait event, such as heel strike (HS) and toe-off (TO) events, based on the hip joint angle signals, thus avoiding the need to use additional sensors regarding those already integrated into the exoskeleton structure.

Although the exemplary embodiments of the disclosure are shown and described for estimating a gait phase based on hip joint angle signals, the embodiments of the disclosure may also be adapted to accommodate different applications of WRs. Accordingly, the embodiments of the disclosure are not limited to hip exoskeletons but may be applied to any robotic joints where it is necessary to detect a repetitive event that contains a specific frequential contribution, such as in robotic joints relating to assisting lower-limb physiological joints, as would be understood from the disclosure by one of ordinary skill in the art.

As shown in FIGS. 1a and 1b, an exemplary WR or RE comprise an active pelvis orthosis (APO) 100 having an actuation system arranged to assist bilateral hip flexion/extension movements transmitted by first and second leg units 140. An exemplary APO is found in U.S. patent application publication 2017/0367919, published Dec. 28, 2017, and incorporated herein by reference. The APO may include a trunk 110 from which actuation units 120 of the actuation system extend to first and second hip joints 130 having first and second encoders 132 thereat and corresponding to the first and second leg units 140. The first and second encoders 132 may be arranged to measure the hip flexion/extension angle of the first and second leg units 140 relative to the trunk 110 at the first and second hip joints 130. The APO preferably includes a power unit 112 and a computing unit 114, comprising a battery and a processor or system-on-module control board, respectively. According to an embodiment, the power unit 112 and the computing unit 114 may be provided in the trunk 110 of the APO. The power unit 112 is preferably arranged to provide assistive power to the actuation units 120 for driving a transmission unit 142 of the first and second leg units 140 at the first and second hip joints 130 based on the computing unit 114 determining the segmentation of a gait cycle of the user from input signals provided by at least one of the first and second encoders 132.

According to varying embodiments, the trunk 110 may be secured to a lumbar cuff for fitting to a user, and the first and second leg units 140 may each be secured to a limb cuff or linkage for transferring mechanical power to the user's limbs.

Figure 5:
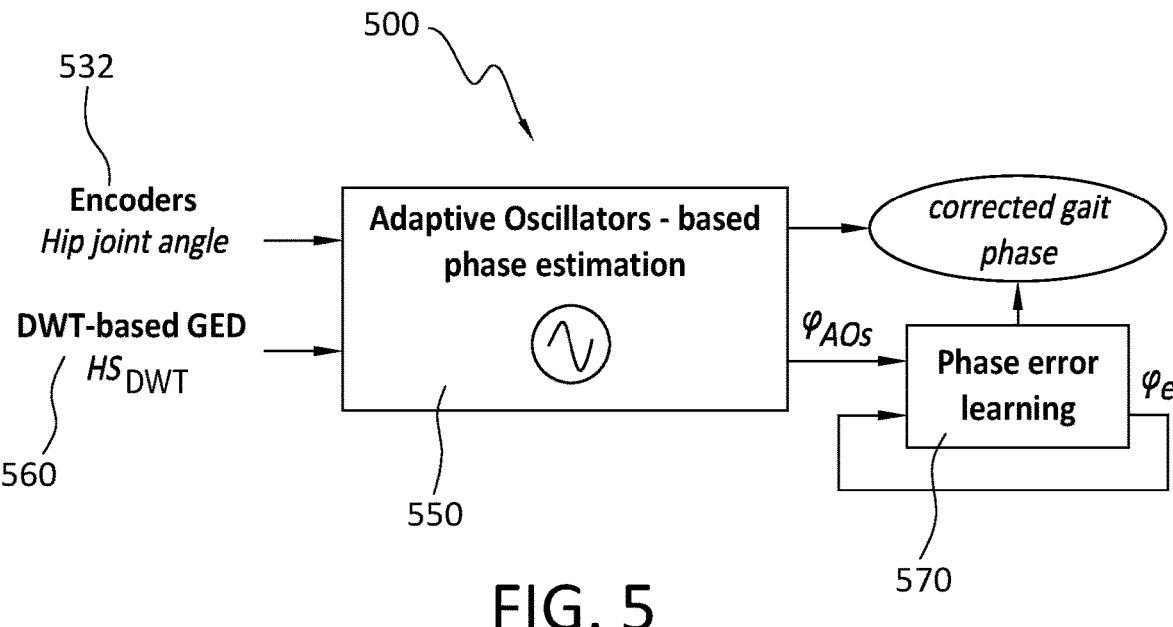
FIG. 5 is a flowchart illustrating the gait phase estimator.

The APO 100 includes a gait phase estimator combined with the computing unit 114 and adapted to process the input signals. As illustrated in FIG. 5, the gait phase estimator 500 includes a phase estimator based on adaptive oscillators 550, a gait-event detector 560, and a phase-error compensator 570. Determination of the gait segmentation of the gait cycle is based only on the input signals 532 from the first and second encoders 132 at the first and second hip joints 130. The gait-event detector may identify a gait event of the gait cycle based on a discrete wavelet transform (DWT) of the input signals. For example, the gait-event detector may be arranged for identifying a heel strike of the gait cycle by using the DWT to process hip joint angle signals measured by at least one of the first and second encoders.

The proposed gait event detection process aims at identifying the HS and TO events in real-time by using the hip joint angle as input signals in a WR. The main block of the GED process is based on using the DWT to decompose the signal into low- and high-level frequency components, which are processed by threshold-based routines to identify the specific events.

From this data, the WR may be arranged to assist the user by an actuation system based on the estimation of the gait phase of a user according to data obtained and processed by the gait phase estimator 500. For this purpose, the gait phase estimator may communicate a determined gait pattern of the user to the computing unit and/or the actuator system for adapting a torque profile of the actuator system to the user's gait pattern.

More specifically, the correct and exact detection of the specific HS and TO events allows the APO to (i) adapt an assistive torque profile of the actuator system in the APO to a gait pattern of the user, with the ability to discriminate between swing and stance phases, (ii) adapt the assistive torque profile to different gait patterns of a user, whether due to physiological or non-physiological characteristics (e.g., subjects with neurological disorders, etc.), (iii) adapt the assistive torque profile to variable walking speeds, and (iv) improve the usability for clinicians.

For example, based on the detection of HS and TO events, the APO may be adapted to generate force by providing an assistive flexion/extension torque at the hip through thigh links at the user's thighs with the correct timing and amplitude to assist the user's unique movement in dynamic tasks. As such, the APO provides an assistive torque having an amplitude and timing that is automatically user-dependent and responsive to the user's needs in real-time due to the gait phase estimation using the DWT of only hip angle signal inputs.

Brief Description of the Gait Cycle

Figure 2:
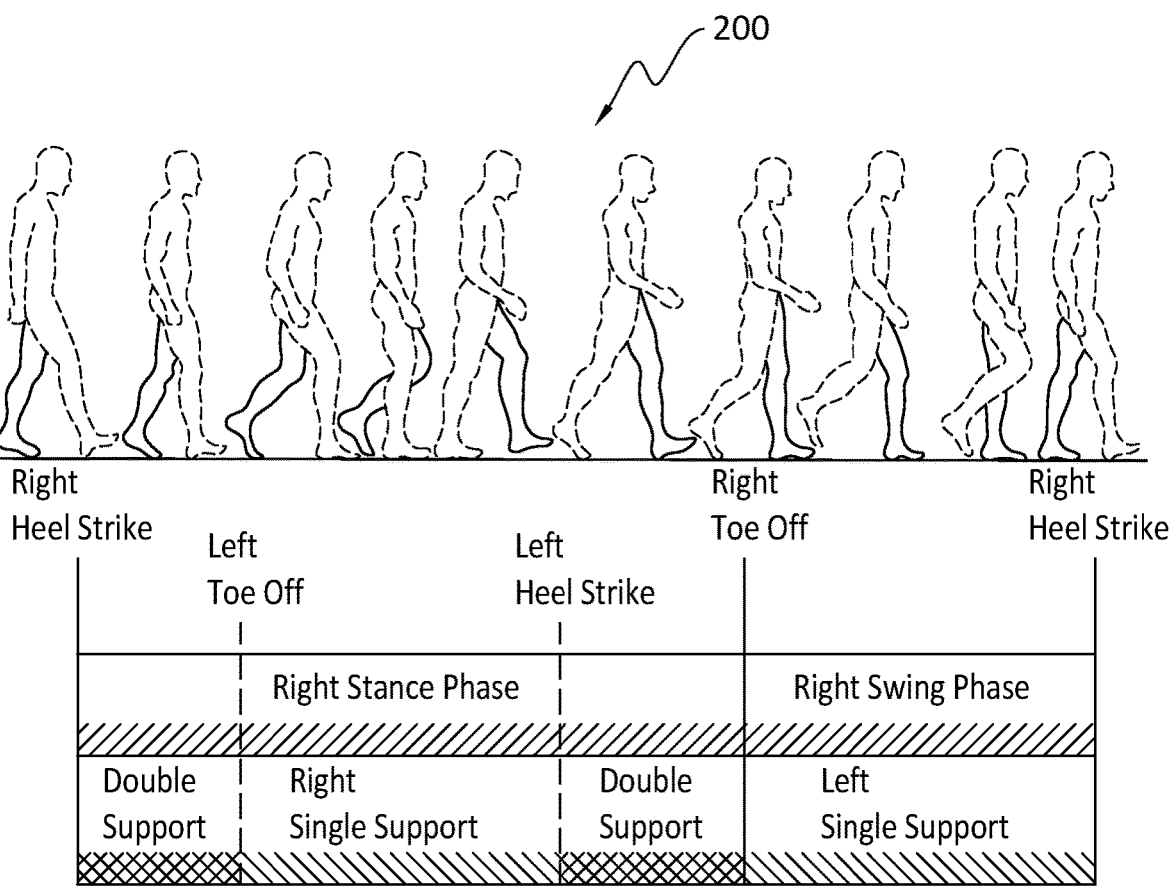
FIG. 2 is an exemplary illustration and the corresponding chart exemplifying a gait cycle segmented at heel strike and toe-off stages.

FIG. 2 exemplifies a single gait cycle 200 and temporal parameters extracted segmenting the gait cycle at HS and TO of both legs, right and left. Periods of double support during the stance phase of the gait cycle (both feet are simultaneously in contact with the ground) give way to two periods of a double float at the beginning and the end of the swing phase of gait (neither foot is touching the ground). Single support is the period when only one foot is in contact with the ground. In walking, this is equal to the swing phase of the other limb.

The stance phase is the period when the foot is in contact with the ground. The swing phase is the period when the foot is not in contact with the ground. In those cases where the foot never leaves the ground (foot drag), it can be defined as the phase when all portions of the foot are in forward motion.

Figure 3:
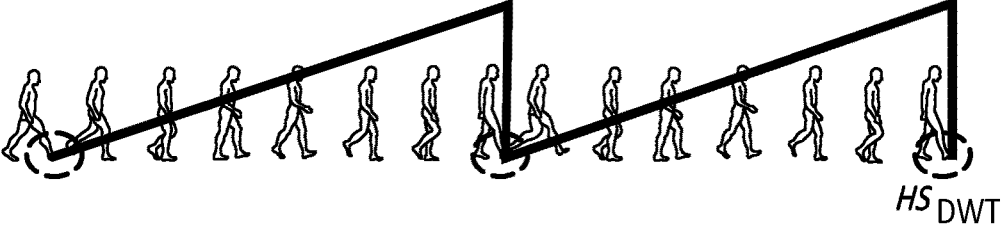
FIG. 3 is another exemplary illustration showing a repeating gait cycle.

FIGS. 2 and 3 show HS (or initial contact). HS comprises the brief period that begins when the foot touches the ground and is the first phase of double support. HS comprises 30° flexion of the hip with full extension in the knee, and the ankle moves from dorsiflexion to a neutral position then into plantar flexion. After this, the knee flexion (5°) begins and increases, just as the plantar flexion of the heel increased. Plantar flexion is allowed by eccentric contraction of the tibialis anterior, and extension of the knee is caused by a contraction of the quadriceps. In addition, a contraction of the hamstrings causes flexion, and the contraction of the rectus femoris causes flexion of the hip.

TO occurs when terminal contact is made with the toe. The hip becomes less extended, and the knee is flexed often 35-40°, and the toes leave the ground.

Discrete-Wavelet-Transform (DWT) and Gait Events Detection (GED)

The GED process identifies the HS and TO events in real-time by using the hip joint angles as input signals obtained from the encoders of the APO. The main block of the GED process centers on the DWT decomposing the signal or signals from the encoders into low- and high-level frequency components, which are processed by threshold-based processes to identify the specific events.

Theoretical Background

The wavelet transform decomposes an arbitrary signal into elementary contributions by convolving the input signal with shifted and scaled versions of a mother wavelet. The DWT computes the wavelet coefficients using a dyadic grid of scales (s) and positions ($\tau$), i.e., $s=2^j$ and $\tau=k\cdot 2^j$. The DWT of a signal x(t) is defined by:

$$DWT(j, k) = \langle x(t), \psi_{j,k}(t)\rangle = \sum_{-\infty}^{\infty} x(t)\psi^*\left(\frac{t - k\cdot 2^j}{2^j}\right)$$

where $\psi_{j,k}(t)$ is the mother wavelet, $\psi^*$ is its complex conjugate and k, $j \in Z$, are the time and frequency scaling parameters of $\psi$, respectively.

An efficient computational method to implement the DWT was developed by Mallat in 1989, using digital filter banks related to the mother wavelet with the scheme of a classical two-channel sub-band coder. The Mallat's algorithm splits the signal spectrum using iteratively High Pass (HP) and Low Pass (LP) filters, that decompose the original signal into high-frequency components, called detail coefficients (cD), and low-frequency components called approximation coefficients (cA). According to Mallat's method, also called Decomposition Pyramid Algorithm, four steps are necessary to decompose the signal: (1) symmetric extension of the input signal, to avoid border effect; (2) filtering by two complementary filters, the HP and the LP filters; (3) cropping the border samples; (4) downsampling by a factor 2. These four steps are iterated until the level of decomposition is equal to the depth of decomposition set for the analysis.

Process Architecture

Figure 4:
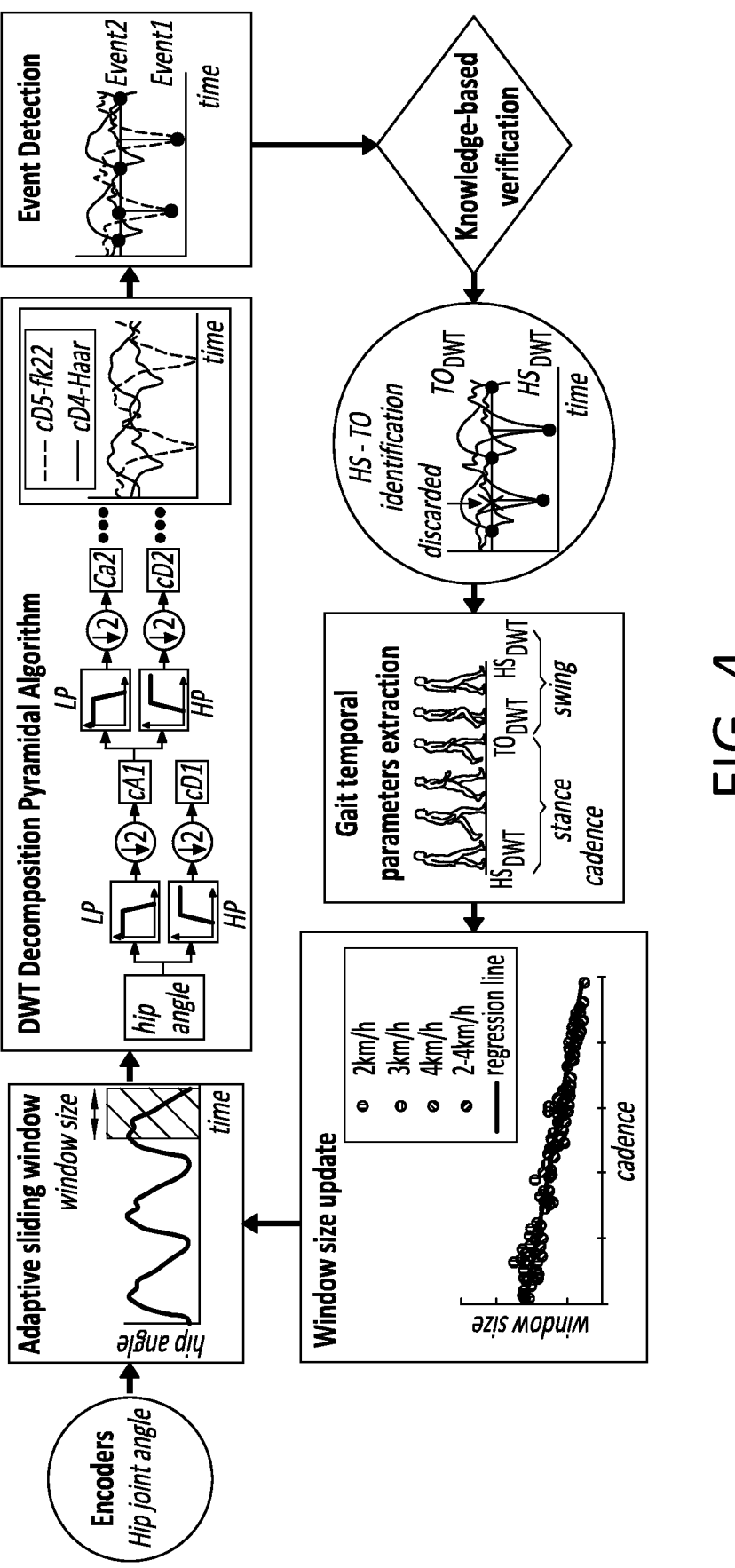
FIG. 4 is a flowchart of a discrete wavelet transform process for gait phase estimation of heel strike and toe-off.

As shown in FIG. 4, the GED process relies on the discrete wavelet coefficients on a vector of hip angle samples, acquired within a time window. Therefore, along with the calculation of the DWT coefficients, the DWT-based GED process for real-time identification of heel strike ($HS_{DWT}$) and toe-off ($TO_{DWT}$) includes these five different steps:

Step 1: Calculation of DWT coefficients. Two DWTs are computed on the input vector using two mother wavelets, i.e., the fk22 and the Haar, selected to recognize the HS and TO events, respectively. Fourth- and fifth-level details coefficients are calculated, respectively, for the Haar (cD4-Haar) and the fk22 (cD5-fk22) mother wavelets.

Step 2: Threshold-based event detection. An event detection process operates on DWT coefficients to detect the valley of the cD5-fk22 coefficient profile (Event1) and the zero-crossing of the cD4-Haar (Event2). Event1 and Event2 have been selected as they occur synchronously with the HS and TO, respectively. To avoid the misdetection of the Event1, a threshold equal to zero is applied to the cD5-f1(22 coefficient before the valley detection.

Step 3: Knowledge-based verification. The verification step aims to avoid false event detections based on the a-priori knowledge of gait biomechanics constraints. Specifically, a gait event detection is rejected unless pre-defined percentages of the stride period have elapsed from the previous HS and TO events. Specifically, Event1 and Event2 are accepted as HS and TO, only if these conditions (2-4) and (3-5) are satisfied, respectively.

$$HS(k) - HS(k - 1) > \rho_1 T^* \quad (2)$$

$$TO(k) - TO(k - 1) > \rho_1 T^* \quad (3)$$

$$HS(k) - TO(k - 1) > \rho_2 T^* \quad (4)$$

$$TO(k) - HS(k - 1) > \rho_3 T^* \quad (5)$$

where T* is the average duration of last five stride periods and $\rho_1$, $\rho_2$ and $\rho_3$ are constants (E [0,1]), equal to 50%, 10% and 20%, respectively.

Step 4: Computation of temporal gait parameters. When a new HS event is detected, the following gait temporal parameters are computed on the last stride: swing duration, stance duration, single support duration, initial/terminal double support duration, cadence.

Step 5: Window length update. At each HS detection, the window length of the input signal is updated, according to the real-time estimated gait cadence. A linear function describes the relationship between the optimal window size and the gait cadence.

Gait Phase Estimator

FIG. 5 illustrates the real-time gait phase estimator 500 architecture based on three subsystems, i.e., the AOs-based phase estimator 550, the phase reset module or gait-event detector 560, and the phase error learning block 570. The AOs-based phase estimator 550 is arranged to estimate the phase, frequency, amplitude, and offset of the harmonics of the hip angle signal. The HS detection event is detected according to the DWT-based method. The phase error learning occurs when an HS event is detected. The phase-reset error $P_e(t_k)$ may be defined as:

$$P_e(t_k) = \begin{cases} -\varphi_{AOs}(t_k), & \text{if } 0 \le \varphi_{AOs}(t_k)\pi \\ 2\pi - \varphi_{AOs}(t_k), & \text{if } \pi \le \varphi_{AOs}(t_k) \le 2\pi \end{cases}$$

A state variable learns how to compensate for the phase-reset error. The following equation models the dynamics of the phase error:

$$\dot{\varphi}_e = \epsilon_\varphi(t_k)\omega(t)e^{-\omega(t)(t-t_k)}$$

where $\epsilon_\varphi(t_k)=k_p[\tilde{P}_e(t_k)-\varphi_e(t_k)]$ is the error capturing the desired variation of $\varphi_e(t)$ into a single stride; $k_p$ is a constant and $\omega(t)$ is the input signal frequency tracked by AOs.

Experimental Validation

The following examples are provided to illustrate specific embodiments of the system and process of the current disclosure and to demonstrate the features and advantages of the embodiments but are not intended to limit the scope thereof. Instead, the examples guide one of ordinary skill in the art in understanding and applying the inventive concepts of the disclosure. The DWT-based GED process and the gait phase estimation have been implemented and tested on a powered APO. Experimental tests aimed at quantifying the performance of the process to identify HS reliably and TO events and estimate gait the phase at different walking speeds. The aforementioned process was benchmarked against the MFA-based GED algorithm, and instrumented shoes equipped with pressure-sensitive insoles were used as a reference signal for the detection of the event.

A. Experimental Setup

Figure 6:
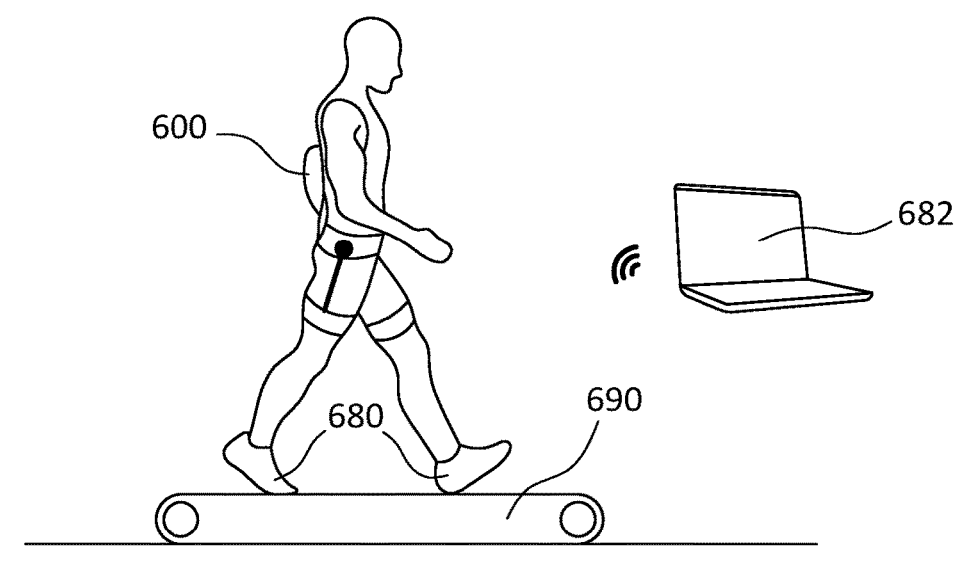
FIG. 6 is an exemplary illustration depicting an experimental setup for evaluating a DWT process for gait phase estimation of heel strike and toe-off.

FIG. 6 generally shows the experimental setup consisted of three systems: the WR defined as an APO 600, two pressure-sensitive insoles 680, and a treadmill 690.

In connection with FIGS. 1a-b and 8a-b, the APO is a bilateral powered hip exoskeleton 800 designed to assist hip flexion/extension movements of people with mild locomotion impairments. The APO is portable and compact with the control electronics and the battery housed in the backpack or trunk 810, including the power supply and computing unit. The mechanical structure comprises a main frame 812 connected to an orthopedic cuff 814, enveloping the user trunk, and leg unit(s) 840 connecting to two linkages 844 that transfer mechanical power to the user's limbs. For each side, an active degree of freedom (DOF) provides hip flexion/extension torque. A passive DOF for hip abduction/ adduction allows the user's movements on the frontal plane. The actuation unit 820 is based on a Series Elastic Actuator architecture (SEA), which ensures compliant and safe interaction both in the so-called "transparent" (i.e., null torque commanded to the actuation units) and "assistive" modes. Two absolute encoders are embedded on each hip joint 830, a 17-bit encoder to measure the deformation of the series spring and a 13-bit encoder to measure the hip flexion/ extension angle.

The control system has a hierarchical architecture composed of a low-, middle- and high-level layer. The low-level layer is responsible for the closed-loop torque control and is based on a proportional-derivative regulator. The middle-level implements the adaptive assistive strategies: (i) estimating the gait phase in real-time and (ii) computing the desired assistive torque. The high-level layer identifies the user's intention of motion.

The instrumented shoes communicate with the APO through a UWB transceiver module (6.8 Mbps data rate) integrated into the APO electronic board. The data acquisition rate is 100 Hz. The shoes are instrumented with pressure-sensitive insoles 680 made of a matrix of 16 optoelectronic sensors. The sensorized insole 680 records in real-time the plantar pressure distribution, the vertical Ground Reaction Force (vGRF), and the Center of Pressure (CoP). Biomechanical variables were saved and processed offline by a processing system 682 to identify reference HS and TO events, which were used as benchmarks for the assessment of the DWT- and MFA-based phase estimation processes. A threshold-based process was applied to the vGRF to identify the HS ($HS_{insole}$) and TO events ($TO_{insole}$).

Figure 7:
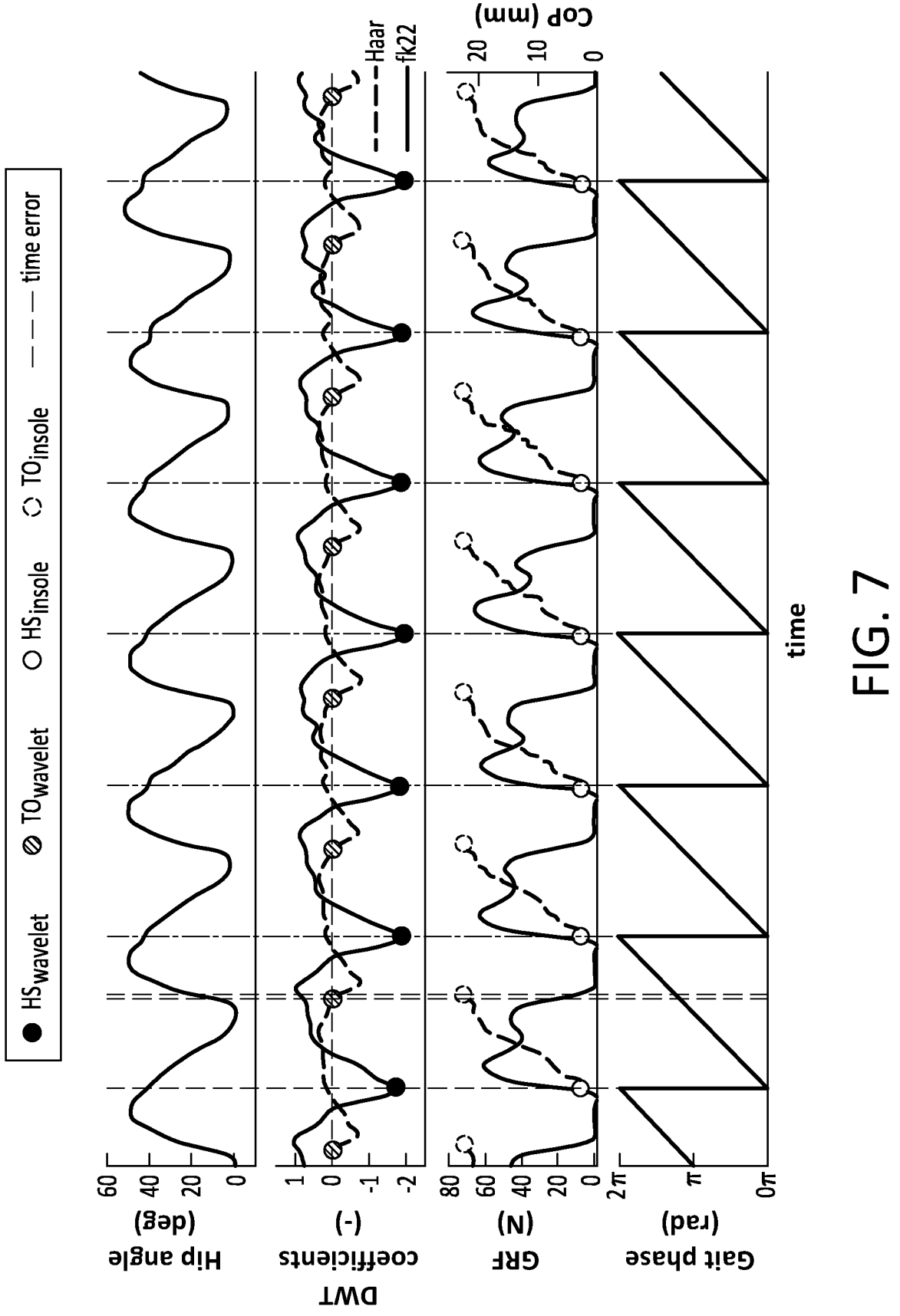
FIG. 7 is a graphical representation plotting a real-time discrete wavelet transform process for gait phase estimation.
Figures 8A, 8B:
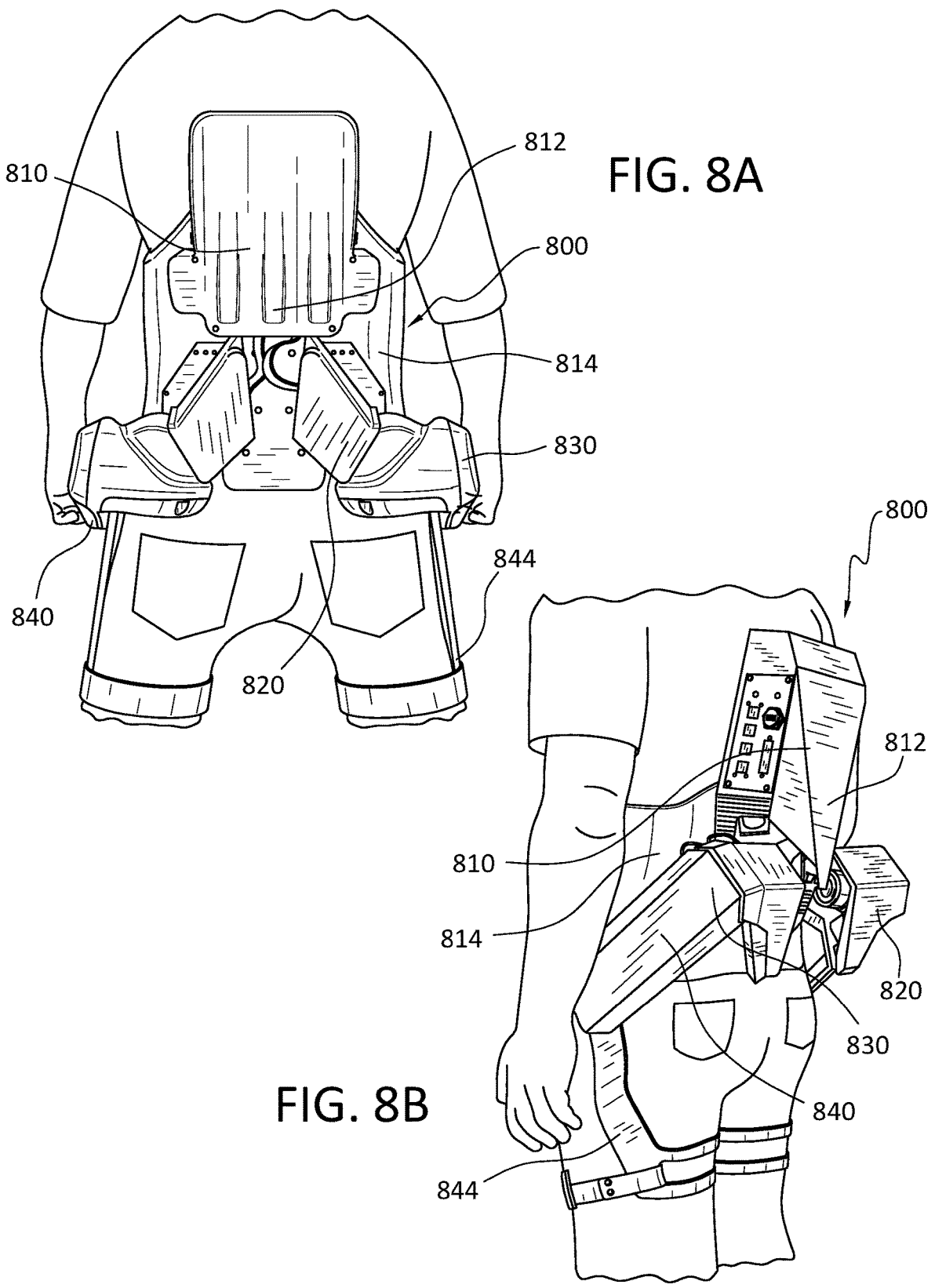
FIGS. 8a and 8b are perspective views illustrating exemplary wearable robot devices arranged as Active Pelvis Orthosis while secured to a user.

FIG. 7 illustrates the hip angle measured by the encoders, DWT coefficients used to identify HS and TO, ground reaction force and center of pressure estimated by the instrumented shoes, and the gait phase estimated in real-time using the novel wavelet-based method. The valley of the fk22 wavelet coefficients corresponds to the estimated HS event (filled black circle), the zero-cross of the Haar wavelet coefficients corresponds to the estimated TO event (filled red circle). Reference events from insoles are identified as the initial (HS) and final point (TO) of the CoP, HS (hollow black circle), and TO (hollow red circle), respectively. Vertical dashed lines mark time errors from estimated and reference events.

B. Experimental Protocol

Eight healthy subjects (seven males) participated in the study (32±3 years old, 75±12 kg, 175±9 cm). Subjects with a shoe size between 41.5-43 EU sizes were included.

Subjects were requested to wear a pair of instrumented shoes 680 and the APO 600 throughout the whole duration of the experiments. While wearing the shoes 680 and the APO 600, subjects participated in two experimental sessions, namely the DWT-mode session and the MFA-mode session. Within each session, subjects were requested to perform four walking tests at different speeds. Three tests were executed at constant speed (i.e. 2 km/h; 3 km/h; 4 km/h), and one at increasing speed (i.e. from 2 to 4 km/h, with speed increases of 0.5 km/h every 30 s). Between two consecutive sessions, subjects took a rest of at least 5 minutes. The order of the sessions was randomized across subjects to avoid order-effects bias.

Each walking test consisted of two 2-minute-walking tests (2 MWTs). The first was executed in Transparent Mode (TM) and the second in Assistive Mode (AM). The TM condition was always performed before the AM condition.

During the AM condition, subjects received a phase-locked hip flexion and extension torque, based on the real-time phase estimation (according to either the DWT-based or the MFA-based segmentation method). Tuning of assistive torque amplitude and timing was manually accomplished. The assistive torque profile consisted of two cosinusoidal curves, the one in flexion with a peak of +6.1±1.2 Nm and the one in extension of −4.3±0.5 Nm, respectively at 61.9±2.1 and 15.6±3.8% of the gait cycle (0% of the gait cycle at $HS_{insole}$). The assistance provided in flexion was approximately equivalent to 20% of the biological hip flexion moment and in extension, was approximately equal to 10% of the biological hip extension moment, taking as reference the hip torque profiles reported by the Winter dataset for walking at normal speed (Winter D. A., *Biomechanics and Motor Control of Human Movement*. 2009).

C. Data Analysis

The comparison of the MFA- and DWT-based processes consisted of quantifying the accuracy and the precision of the gait phase estimation and GED blocks. In order to assess the performance of each of the gait phase estimations, two Key Performance Indicators (KPIs) were computed.

The RMS of the Phase Reset Error (RMS_$P_e$) was computed as:

$$RMS\_P_e = \sqrt{\sum_{i=1}^{N} \frac{(P_e(i))^2}{N}}$$

where $P_e(i)$ is the phase reset error of the i-th stride and N is the number of strides in the specific walking test. In addition, the linearity of the estimated phase was computed as the standard deviation of the first derivative of the estimated phase $$\dot{\varphi} = \frac{d\varphi(t)}{dt}.$$

For each walking test, the median value of the phase linearity error was calculated.

Additional parameters were computed to assess the performance GED blocks with respect to insole reference events. The temporal distance of the MFA and the $HS_{DWT}$ from the $HS_{insole}$ was computed to investigate the phase shift and the invariance of the phase reset events compared to the reference heel strike event. Also, to evaluate TO identification performance of the DWT-based GED, the temporal distance between $TO_{DWT}$ and $TO_{insole}$ was computed. For each walking test, the median values of the performance indicators were extracted.

Misdetections of the MFA, $HS_{DWT}$, and $TO_{DWT}$ were checked, by computing the gait cycle duration based on these events. The recognition accuracy for these gait events was computed as the ratio between the number of events correctly recognized and the total number of strides. Finally, the capability of the DWT-based GED process to extract temporal gait parameters was investigated using the Bland-Altman and Regression Analysis for the cadence and by computing the Mean Absolute Error (MAE) of stance, swing, single and double support durations estimated by the reference signals and the DWT-based process.

D. Statistical Analysis

For each above-described performance indicator, across-subject medians and interquartile ranges (IQRs) were extracted to quantify accuracy and precision of the gait phase estimations and GEDs for both methods (i.e. MFA and DWT-based).

After verifying the normality of the data with the Lilliefors test, an inferential statistical test (one-tailed Wilcoxon signed-rank) was conducted to infer about statistical differences of accuracy and precision between the two methods, MFA and DWT-based. The statistical significance was set at 5% for all analyses.

Discussion

Extrapolating, in real-time, reliable, and accurate information about the gait phase is an essential requirement for a WR to enable human-robot synchronization and provide a smooth and safe assistive action, consistently with human gait biomechanics.

The gait-phase estimator for a portable hip exoskeleton of this disclosure is based on the DWT and AOs. The gait-phase estimator adaptively identifies the beginning and the end of each step through a novel wavelet-based gait event detector and learns the walking frequency with AOs. The gait-phase estimator process, according to the current disclosure surprisingly demonstrates that distal events, related to foot-ground interaction (i.e., HS and TO), can be reliably extracted by exploiting only signals of hip joint angles from integrated sensors in the exoskeleton, and this information is reliable to control the robotic hip exoskeleton.

The $HS_{DWT}$-based gait phase estimator process is reliable and robust enough to be used for delivering actual torque and shows several advantages over previous solutions of the prior art, such as the use of pressure-sensitive insoles. The proposed method shows remarkable performance in estimating the gait phase in real-time, with most performance indicators being invariant to assistive conditions and gait speeds. This result is paramount to maximize the human-robot cooperation and potentially energetic cost benefits, as recognized in corresponding literature. Further, with the proposed approach, the null phase of the estimated gait phase occurs synchronously with the HS event, and information about the TO event is provided in real-time. Such features are crucial to design phase-locked assistive profiles easily ascribable to physiological hip torque profiles as reported in most biomechanics literature, thus making the tuning procedure user-friendly for the clinical personnel. Similarly, the possibility of detecting both HS and TO events according to the instant disclosure opens the possibility of using the exoskeleton for estimating temporal gait parameters (stance, swing and double support duration) and symmetry indexes. For assistive devices, the additional capability to assess gait quality of the user is a relevant feature for assessing the outcome of any home-based rehabilitation program and would enrich the spectrum of the available functions of WRs.

A. Performance Invariance With Gait Speed and Assistance Modality

The huge variability in gait patterns in healthy and impaired users makes the development of user-independent gait segmentation processes challenging. Several factors influence joint kinematics and kinetics, such as the presence of any gait pathology, as well as factors like gender, age, weight, height, walking speed, cadence, the surface of the terrain, slope, etc. Stride-to-stride variability is also more evident at the hip compared to the ankle, making the development of hip-based segmentation processes even more complicated. Likely due to these impediments, few studies have considered gait segmentation processes for hip exoskeletons at all, and no known studies have considered gait segmentation processes for hip exoskeletons having continuous assistive action along the gait cycle, i.e., both in flexion and extension, and with torque amplitudes considered adequate for gait assistive scenarios.

The results achieved according to embodiments of the current disclosure demonstrate that the $HS_{DWT}$-based gait phase estimator is robust to different walking speeds and that the assistive action of the robot does not deteriorate performance. Results show that this process outperforms MFA-based processes in all tested conditions, as the phase reset error of the DWT-base phase estimator was about 64% lower in all conditions. At various speed conditions, phase performance indicators showed significantly smaller inter-subject variability with $HS_{DWT}$ compared to MFA-based methods. Although the adopted sensing technology may be similar for both methods, i.e., hip encoders integrated in the mechanical structure of the exoskeleton, the performance of the $HS_{DWT}$-based gait phase estimator provides considerable improvements over prior art methods, including MFA-based methods.

B. Comparison With AOs-Based Gait Phase Estimators Using Distal Sensory Apparatuses While several recent studies have proposed new methods to continuously estimate a gait phase in real-time using AOs, these existing methods require the use of sensory signals from different, predominantly distal, locations, such as instrumented shoes, a wearable depth camera, and noncontact capacitive sensors. Further, the wavelet-based phase estimator, according to the present disclosure, surprisingly outperforms existing methods in the literature while advantageously requiring only the use of proximate hip joint encoders. In comparative examples, the RMS of the phase reset error of the current $HS_{DWT}$-based gait phase estimator was, on average, 2.1% of the gait cycle in TM and 1.4% of the gait cycle in AM, relative to prior art values of on average, 2.5% of the gait cycle in TM achieved using instrumented shoes, 4% of the gait cycle in TM and 3.6% of the gait cycle in AM using capacitive sensors worn on the calf, and 3.8% of the gait cycle using a wearable depth camera.

Of particular advantage, the improved results of the $HS_{DWT}$-based gait phase estimator of the current disclosure extend to a broader range of experimental conditions and assistance. This is particularly important as variability in the phase estimation may influence the repeatability of the assistive profile, which has been shown to reduce the effectiveness of the assistive action. For example, delivering the assistive torque at the wrong time in the gait cycle can either lower the efficacy of the assistance or even contrast the residual movement abilities of target end-users.

C. Comparison With Gait Phase Estimators Using Sensory Apparatuses of Hip Exoskeletons While self-containment of a sensory system within an exoskeleton structure has been considered a convenient design choice to develop usable and acceptable exoskeletons by final end-users, differences in joint kinematics and kinetics from user to user, especially when measured from the hip, have prevented the successful development of such self-contained systems. In particular, inertial measurement units have been investigated to develop a control strategy for hip exoskeletons. Still, these investigations demonstrated that user-specific training was required before successful utilization and failed to achieve phase reset error levels comparable with those of the current disclosure. As such, the systems and processes of the instant disclosure show the additional advantages of not requiring subject-specific training of the model and adapting seamlessly to abrupt changes in gait speed, relative to known implementations.

D. Computation of Temporal Gait Parameters

For an assistive lower-limb device conceived for clinical rehabilitation and assistance outside the laboratory environment, the additional capability to assess the gait quality of the user is an important feature. The possibility to evaluate the user's gait pattern in terms of temporal gait parameters and symmetry-related indexes, without additional instruments and outside dedicated gait analysis laboratories, paves the way for novel telemonitoring techniques, in which the clinician can remotely assess the patient while walking outdoors.

In the present case, the described embodiments are able to extract both HS and TO events using only a hip exoskeleton, without additional instruments and outside dedicated gait analysis laboratories. While no similar possibility of extracting HS and TO events using a hip exoskeleton has been considered in the art, DWT-based phase estimator can reliably detect the HS and TO events with an average error of 0.4 and −1.1%, respectively. Surprisingly, this advantageous level of performance is in line with those of reported methods based on arrangements of wearable sensors in the art.

CONCLUSION

It is to be understood that not necessarily all objects or advantages may be achieved under any embodiment or method of the disclosure. Those skilled in the art will recognize that the systems and methods of the disclosure may be embodied or carried out, so it achieves or optimizes one advantage or group of advantages as taught herein without achieving other objects or advantages as taught or suggested herein.

The skilled artisan will recognize the interchangeability of various disclosed features and methods. Besides the variations described, other known equivalents for each feature and method can be mixed and matched by one of skill in this art to construct an HRI under principles of the present disclosure. It will be understood by the skilled artisan that the features described may apply to other types of orthopedic, prosthetic, or medical devices.

The invention claimed is:

1. A method for controlling a wearable robot having at least one leg unit, the method comprising:
   (a) obtaining at least one input signal from at least one encoder tracking a hip joint angle versus time, the at least one encoder attached to the wearable robot and corresponding to the at least one leg unit;
   (b) windowing the at least one input signal within a window size based on time versus the hip joint angle;
   (c) decomposing the at least one input signal with a Discrete Wavelet Transform (DWT);
   (d) identifying at least one gait event in a gait cycle by using the DWT;
   (e) computing temporal gait parameters based on the at least one gait event;
   (f) generating an assistive force in the at least one leg unit in response to the temporal gait parameters.

2. The method of claim 1, further comprising the step of:
   (f) updating the window size as a function of estimated gait cadence.

3. The method of claim 2, further comprising the step of repeating steps (a)-(g) upon detection of the at least one gait event and for each subsequent gait cycle.

4. The method of claim 2, wherein the at least one encoder is only arranged to correspond to a hip joint.

5. The method of claim 1, further comprising using a gait phase estimator arranged to track at least a gait phase in real time and identify at least one biomechanical gait event to reset the gait phase and segment the gait cycle.

6. The method of claim 5, wherein the gait phase estimator includes an adaptive oscillator phase estimator, a phase reset module, and means for phase error learning.

7. The method of claim 6, wherein the adaptive oscillator phase estimator is arranged to estimate at least one of phase, frequency, amplitude, and offset of harmonics of the at least one input signal corresponding to the hip joint angle.

8. The method claim 6, wherein the means for phase error learning includes computing a phase-reset error when a gait event is detected.

9. The method of claim 1, wherein the step of identifying a gait detection event in the gait cycle using the DWT comprises the following sub-steps:
   calculating discrete wavelet coefficients based on the at least one input signal;
   determining the gait event to identify at least one of heel strike and toe-off;
   detecting the at least one of the heel strike and the toe-off for the at least one leg unit.

10. The method of claim 9, wherein the step of calculating discrete wavelet coefficients based on the at least one input signal includes taking input signals at the hip joint angle.

11. The method of claim 9, wherein step of identifying at least one of the heel strike and the toe-off in the gait cycle using the DWT further comprises the following sub-step:
   (v) computing temporal gait parameters based on the detection of the at least one of the heel strike and the toe-off.

12. The method of claim 9, wherein computation of temporal gait parameters includes: duration of (i) stride time; (ii) swing phase; (iii) stance phase; and (iv) at least one of the following parameters selected from the group consisting of single support, initial double support, terminal double support, double support, and cadence.

13. The method of claim 1, wherein at least one adaptive oscillator is arranged to decompose a periodic input signal into different harmonics including at least one of phase, frequency, amplitude and offset.

14. The method of claim 13, further comprising the steps of determining an error between a reconstructed periodic input signal and the periodic input signal, and feeding the error to correct an estimate of a gait phase.

15. The method of claim 1, wherein the wearable robot includes an active pelvis orthosis having an actuation system arranged to assist bilateral hip flexion/extension movements transmitted by the at least one leg unit including first and second leg units, the active pelvis orthosis including a trunk from which hip joints extend and whereat first and second encoders of the at least one encoder are arranged and correspond to the first and second leg units, respectively.

16. The method of claim 15, wherein the first and second encoders are arranged to measure a hip flexion/extension angle of the first and second leg units relative to the trunk.

17. The method of claim 15, further comprising driving the first and second leg units according to an estimated gait cycle and the at least one input signal transmitted by the first and second encoders, the active pelvis orthosis including a power unit and a computing unit, the power unit providing assistive power to the first and second leg units at the hip joints in response to the computing unit determining segmentation of the gait cycle.

18. The method of claim 17, wherein determination of the segmentation of the gait cycle is only performed on the basis of the at least one input signal from the first and second encoders at the hip joints.

19. A wearable robot comprising:

an active pelvis orthosis having an actuation system arranged to assist hip flexion/extension movements transmitted by at least one leg unit, the active pelvis orthosis including a trunk from which a hip joint extends and whereat at least one encoder is arranged and corresponds to the at least one leg unit and transmits at least one input signal, respectively, the at least one encoder is arranged to measure the hip flexion/extension angle of the at least one leg unit relative to the trunk;

a power unit and a computing unit, the power unit providing assistive power to the at least one leg unit at the hip joint in response to the computing unit determining gait segmentation of a gait cycle from at least one encoder;

a gait phase estimator arranged to track at least a gait phase in real time and identify at least one biomechanical gait event to reset a gait phase and segment the gait cycle;

a gait-event detector is arranged to identify a flexion angle from input signals based on a discrete wavelet transform (DWT) arranged for identifying at least one relevant phase-invariant gait event of the gait cycle.

20. The wearable robot of claim 19, wherein determination of the gait segmentation of the gait cycle is only performed on a basis of the at least one input signal obtainable from the at least one encoder.

\*    \*    \*    \*    \*